United States Patent [19]
Askins et al.

[11] Patent Number: 5,400,422
[45] Date of Patent: Mar. 21, 1995

[54] TECHNIQUE TO PREPARE HIGH-REFLECTANCE OPTICAL FIBER BRAGG GRATINGS WITH SINGLE EXPOSURE IN-LINE OR FIBER DRAW TOWER

[75] Inventors: Charles G. Askins, Upper Marlboro; Edward J. Friebele, Cheverly, both of Md.

[73] Assignee: The United States of America as represented by the Secretary of the Navy, Washington, D.C.

[21] Appl. No.: 6,544

[22] Filed: Jan. 21, 1993

[51] Int. Cl.⁶ ............................................. G02B 6/34
[52] U.S. Cl. ........................................ 385/37; 385/10
[58] Field of Search ...................... 385/37, 49, 50, 122, 385/10

[56] References Cited

U.S. PATENT DOCUMENTS

| | | | |
|---|---|---|---|
| 4,500,855 | 2/1985 | Feinberg | 372/21 |
| 4,749,248 | 6/1988 | Aberson et al. | 385/24 |
| 4,761,073 | 8/1988 | Meltz et al. | |
| 4,806,012 | 2/1989 | Meltz et al. | |
| 4,807,950 | 2/1989 | Glenn et al. | |
| 5,028,109 | 7/1991 | Lawandy | 385/122 |
| 5,144,690 | 9/1992 | Domash | 385/126 |
| 5,210,807 | 5/1993 | Ames | 385/24 |

OTHER PUBLICATIONS

Askins et al., "Fiber Bragg Reflectors Prepared by a Single Excimer Pulse", Optics Letters 17(11), pp. 833-835 (Jun. 1, 1992).

*Primary Examiner*—Rodney B. Bovernick
*Assistant Examiner*—Robert E. Wise
*Attorney, Agent, or Firm*—Thomas E. McDonnell; John J. Karasek

[57] ABSTRACT

A process for making an optical reflection grating in a glass fiber includes exposing an unjacketed optic fiber to a single writing pulse from a pair of interfering light beams that form an interference pattern in the fiber. A novel optical fiber has at least one optical grating with a preselected Bragg spacing in at least one region of the fiber, with a periodic modulation in its index of refraction, with high thermal stability and narrow linewidth. A process for making an array of optical reflection gratings in a glass fiber includes exposing a fiber to a plurality of writing pulse from a pair of interfering light beams that form an interference pattern in the fiber, where these pulses are applied sequentially as the fiber is drawn from a draw furnace. A novel optical fiber has a plurality of unspliced gratings with high thermal stability and narrow linewidth.

25 Claims, 5 Drawing Sheets

TECHNIQUE TO PREPARE HIGH-REFLECTANCE OPTICAL FIBER BRAGG GRATINGS WITH SINGLE EXPOSURE IN-LINE OR FIBER DRAW TOWER

BACKGROUND OF THE INVENTION

1. Field of the Invention

This invention relates to an improved process for photowriting optical gratings and arrays of gratings into glass fibers, and the gratings and arrays of gratings produced by this process.

2. Description of the Related Art

Optical gratings in glass fibers are finding their way into an ever-growing number of applications, including communications systems, strain sensing systems, and optical processing and computing systems. Optical gratings in glasses are most typically laser-induced, i.e. photowritten into glasses by interfering laser beams. See, e.g., U.S. Pat. No. 4,807,950, "OPTICAL FIBER IMPRESSED REFLECTION GRATINGS", issued Feb. 28, 1989 to Meltz et al. These gratings selectively reflect axially transmitted light.

Production of these gratings in glass fibers by available methods is highly unsatisfactory. Consequently, when these gratings are available at all, they cost several thousand dollars apiece. More commonly, however, manufacturers who want to incorporate these gratings into their systems will find that the gratings are simply unavailable at any price.

A typical manufacturing scheme involves the following steps: The jacketing is carefully removed from a segment of glass fiber, under clean room conditions, with great care being taken to minimize contact with the unjacketed fiber surface. The fiber is then positioned in a laser interferometer, with steps taken to isolate the fiber from external vibrations, air currents, and other sources of unwanted motion. The fiber is then transversely exposed to between several hundred to several thousand shots from interfering pulsed light beams, which are usually formed by splitting the beam from a writing laser. This usually takes anywhere from several tens of seconds to several minutes exposure. Alternatively, the writing laser may be a cw laser. After the fiber is sufficiently exposed to form a grating with a useable index of refraction modulation, $\Delta n$, the grating is carefully rejacketed, again with great pains being taken to avoid unwanted handling of the fiber.

There are several adverse consequences to this process. One consequence is that these hundreds or thousands of laser shots must be superimposed on top of one another with great precision, or no grating will result. Problems that prevent the precise superpositioning of multiple laser shots include vibrations, air currents within the interferometer arms, thermally induced dimensional changes, and pointing instabilities in the laser.

Moreover, this process is not precisely controllable. Consequently, the grating-writing process must be continuously monitored as it is carried out. This is typically done by probing the grating with light guided in the fiber core as the grating is written, and monitoring the reflected signal from the probe beam.

Another problem with this method is that it requires complex processing steps and a great deal of handling of the fiber. Newly drawn and coated glass fibers have excellent tensile strength, provided the quality of the glass surface is good. This strength is tremendously sensitive to the quality of the glass surface. Because grating writing is most effectively done on a bare (unjacketed) fiber, careful stripping, cleaning, and immobilization of the fiber prior to the lengthy exposure step are necessary to preserve as much of this strength as possible. After exposure, the bare fiber must be rejacketed to maintain its remaining surface quality (and consequent strength). Inevitably, there will be some damage to the glass surface, with some consequent loss of fiber strength.

An additional disadvantage of this process is that it is necessarily a batch process, carried out on a single fiber segment at a time, after that segment is drawn, coated, cut, and stripped of its jacketing. This has the disadvantage of making high speed production runs unavailable. Another disadvantage to batch processing is that large arrays of gratings (such as the arrays that would be used for distributed strain sensing) are assembled by splicing together individual grating segments. These splices are typically not as strong as the fibers they connect. This makes these assembled grating arrays subject to failure under strain. Furthermore, these splices will cause some transmission loss, and may contribute to spurious reflections.

The problems of having gratings with low tensile strength connected by splices with low tensile strength is particularly critical because one of the most important envisioned uses for these gratings is in strain sensing systems. See, e.g.. U.S. Pat. No. 4,806,012, "DISTRIBUTED, SPATIALLY RESOLVING OPTICAL FIBER STRAIN GAUGE", issued Feb. 21, 1989, to Meltz et al. Strain sensor arrays that fail under strain are of clearly limited usefulness.

There are also disadvantages inherent in the gratings produced by this method. For example, gratings produced by this method are not thermally stable. These gratings will disappear after only a few minutes at fairly moderate temperatures (for instance, at temperatures above 300° C. these gratings disappear rapidly). This makes these gratings unsuitable for use in systems where they would be exposed to high temperatures. These high temperatures may be encountered as part of the manufacturing process, as long-term exposure during normal system operation, or as occasional transient exposure during system operation. For example, strain sensing arrays in composite airframes are highly desirable. However, incorporating composite materials into high temperature applications would require strain sensing gratings of proven thermal stability.

SUMMARY OF THE INVENTION

Accordingly, it is an object of this invention to write optical gratings in glass fibers by a continuous, high volume process as these fibers are drawn from a draw furnace, without the need for stripping and rejacketing the fiber, and without the need for concurrently probing the grating.

It is a further object of this invention to produce optical gratings in glass fibers by exposing the fibers to a single pulse from interfering write beams.

It is a further object of this invention to produce optical gratings in glass fibers with high thermal stability.

It is a further object of this invention to produce long, unspliced arrays of optical gratings in glass fibers with high tensile strength.

It is a further object of this invention to produce optical gratings in glass fibers with near-theoretical bandwidth.

These and additional objects of the invention are accomplished by the structures and processes hereinafter described.

The process of the invention comprises transversely exposing an unjacketed glass fiber to a single pulse from a pair of intersecting writing beams, to create an interference pattern in the glass fiber. This pulse must be of sufficiently high fluence to induce a permanent index change in the glass fiber at positions corresponding to the interference intensity pattern.

The novel gratings made by the process of this invention have exceptionally high thermal stability and linewidths approaching the theoretical limit. The novel arrays of gratings made by this process have consistently high tensile strength and signal quality, due to the absence of splices.

BRIEF DESCRIPTION OF THE DRAWINGS

A more complete appreciation of the invention will be readily obtained by reference to the following Description of the Preferred Embodiments and the accompanying drawings in which like numerals in different figures represent the same structures or elements, wherein.

DESCRIPTION OF THE PREFERRED EMBODIMENTS

Gratings produced by exposing glass fibers to multiple laser pulses typically require total fluences of about 1000 J/cm$^2$ to obtain index modulations better than 10$^{-5}$. If one attempted to put this much energy into a glass fiber with a single ultraviolet laser pulse, the glass would be destroyed.

Surprisingly, however, it has been discovered that by concentrating a much smaller amount of energy into a very short exposure time, a grating 11 is generated with an equally good index modulation as those made with longer exposure times with larger total quantities of energy delivered. In other words, the permanent change in the index of refraction sharply depends upon the intensity of the exposing light, and is not simply linearly cumulative with the amount of energy absorbed.

Figure 6:
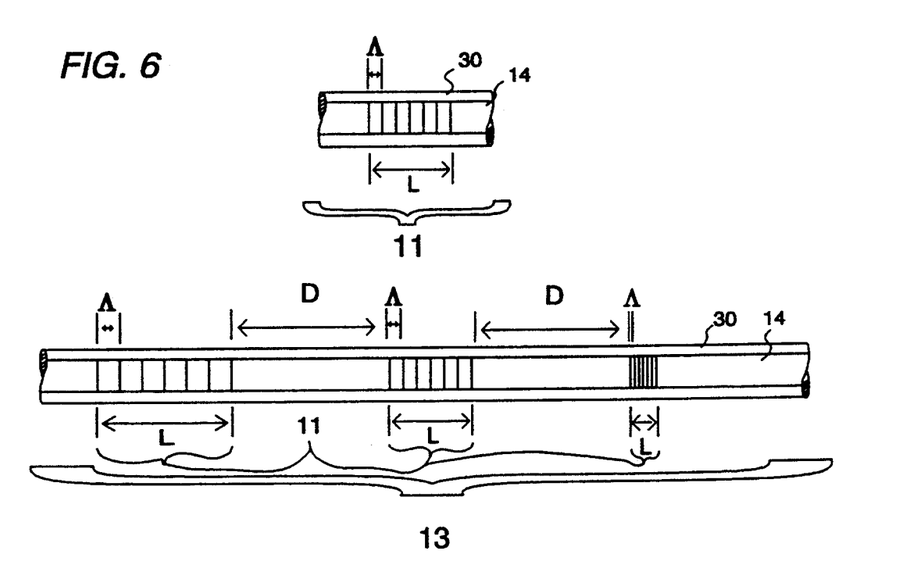
FIG. 6 shows a novel grating and a novel array of gratings.

It has also been discovered that by concentrating a much smaller amount of energy into a very short exposure time, a novel grating 11, shown in FIG. 6, with high thermal stability is formed. This is surprising because previous thermal studies of induced glass defects have correlated grating formation with charge trapping sites, which begin to anneal away at as low as 150° C. and have essentially vanished by about 300° C. Persistence of gratings 11 made by the present process at temperatures over 700° C. suggests that this process is accessing and/or producing different defects than have previously been described. Without wishing to be bound by theory, applicants hypothesize that the present process may access and/or induce interstitial dislocations and/or short-range lattice disorders.

As shown in FIGS. 1, 2, 3, and 4, the grating 11 is formed in an interferometer 10 by exposing the bare glass fiber (i.e. the fiber core and cladding) 14 to a single writing pulse from a pair of intersecting, interfering laser beams 16,18 of equal wavelength and essentially equal intensity. The interfering laser beams 16,18 are preferably formed by dividing, with a beamsplitter 20, a writing laser beam 22 into two beams 16,18 of essentially equal intensity. These two beams 16,18 are intersected with each other to form an interference pattern, preferably with path length differences of not more than the coherence length of the writing laser 23. The glass fiber 14 is positioned in the intersection region 24 of the two beams 16,18. The grating 11 forms as the interfering beams 16,18 induce a periodic change in the index of refraction in the glass. The period $\Lambda$ of the resulting grating 11 is controlled by adjusting the angle between the intersecting write beams 16,18.

Figure 5:
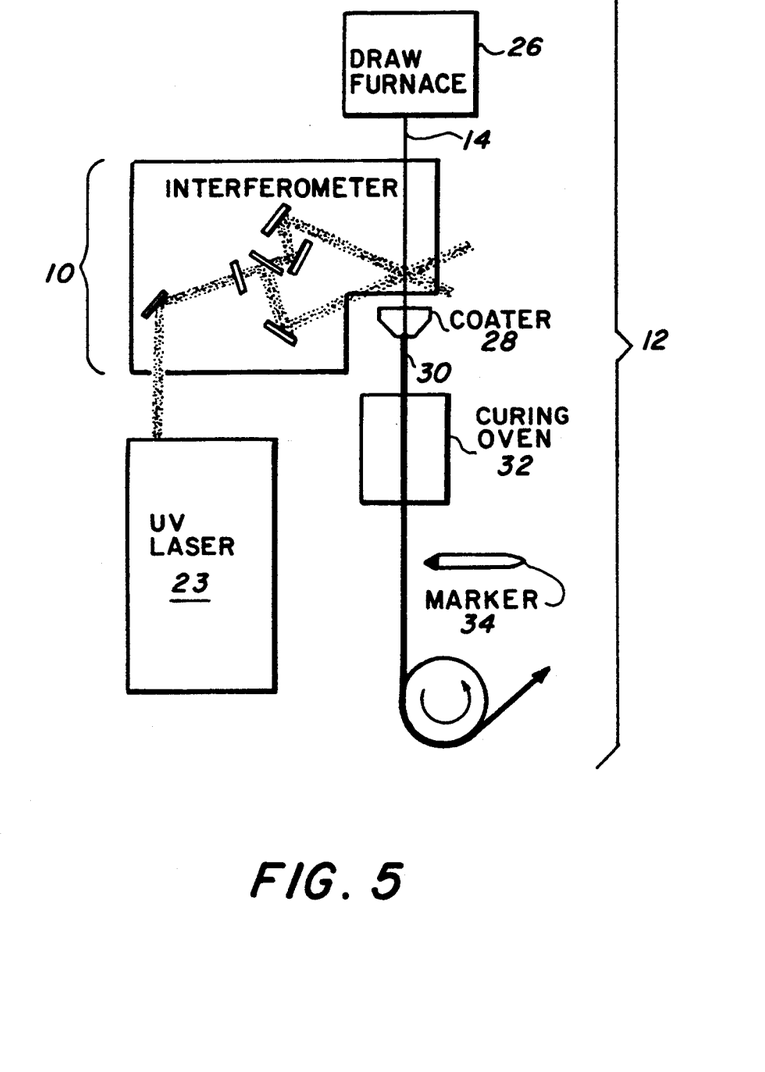
FIG. 5 shows a preferred apparatus for continuous production of gratings.

Preferably, as shown in FIG. 5, the unjacketed fiber 14 is photowritten in an on-line system 12 as it is drawn from the draw furnace 26 (also called a draw tower), without intervening steps of jacketing and then stripping the fiber before exposure. Most preferably, the fiber 14 is drawn from the draw furnace 26, exposed to form the grating 11, passed through a coater 28 to apply the jacketing 30, passed through a curing oven 32, and optionally marked with a marker 34 to locate and label gratings 11 on the fiber 14, in a continuous process as the fiber 14 is drawn from the furnace 26. In this embodiment, arrays 13 of gratings 11 can be written into an unspliced fiber of arbitrary length (e.g. 5 meters, 100 meters, or 1000 meters), with any selected spacing D between the gratings, as shown in FIG. 6. The length of this unspliced array 13 is limited only by the amount of the preform in the draw furnace 26.

As the fiber 14 is drawn, it may be desirable to vary the grating period $\Lambda$ (and consequently the Bragg reflecting wavelength) between successive gratings 11 in an array 13. This may be accomplished by synchronously translating and rotating the mirrors 21 in the two interferometer 10 arms to vary the writing angle $\phi b$, such that the intersection 24 of the beams 16,18 continues to coincide with the fiber 14, as the intersection angle $\phi$ is varied, as shown in FIG. 6.

The maximum permissible rate at which the fiber 14 may be drawn from the furnace 26, and a grating 11 written thereon, is determined by the desired grating spacing $\Lambda$ and pulse duration ($\tau$) of the writing laser 23. For a given grating spacing and pulse duration, there will be a practical upper limit on the rate at which the fiber 14 can be drawn from the tower 26 without blurring the interference pattern, thereby reducing the reflectivity of the grating 11. For instance, to write a grating for reflectance at $\geq 800$ nm with a 20 ns pulse ($\tau \leq 20$ ns), good results should be achievable with fibers drawn rates of up to 5 m/s. Presumably, a grating written for reflectance at $\geq 1600$ nm with a laser having $\tau \leq 20$ ns could be written at a 10 m/s draw rate.

Any glass in which a single optical pulse gives rise to a sufficient and permanent index change can be used in the present invention. Preferably, the glass for the fiber is one of the following: germanosilicate, rare earth-doped silicate, or cerium-aluminum-doped silicate. Pr and Eu are example rare-earth dopants. Most preferably, the glass is germanosilicate. Most preferred germanosilicate are doped with between about 5 mol % and about 25 mol % Ge overall.

The selection of the glass will limit the selection of the writing beam source, and vice-versa. The writing laser 23 should have a wavelength corresponding to a spectral absorption in the glass which can serve to convert the incident laser photons to a permanent alteration in the glass structure, resulting in a permanent index change. For example, for germanosilicate glasses, a suitable writing laser wavelength is about 248 nm.

The writing laser 23 is preferably one that can deliver a high fluence in a single pulse, and has good beam quality, both in terms of its coherence length and its transverse wavefront quality. A high fluence pulse is defined herein to be a laser pulse that can effect, according to this invention, a useable index modulation. A single-pulse fluence of at least about 0.5 J/cm$^2$ per beam at said fiber is sufficient; the capacity to deliver several J/cm$^2$ per beam at said fiber is preferable.

A variety of interferometers 10 may be employed to make gratings 11 according to this invention, each of which has its particular advantages. The selection of a particular interferometer 10 will be governed by the criteria set forth below, as will be understood by skilled practitioners in the art.

Figure 1:
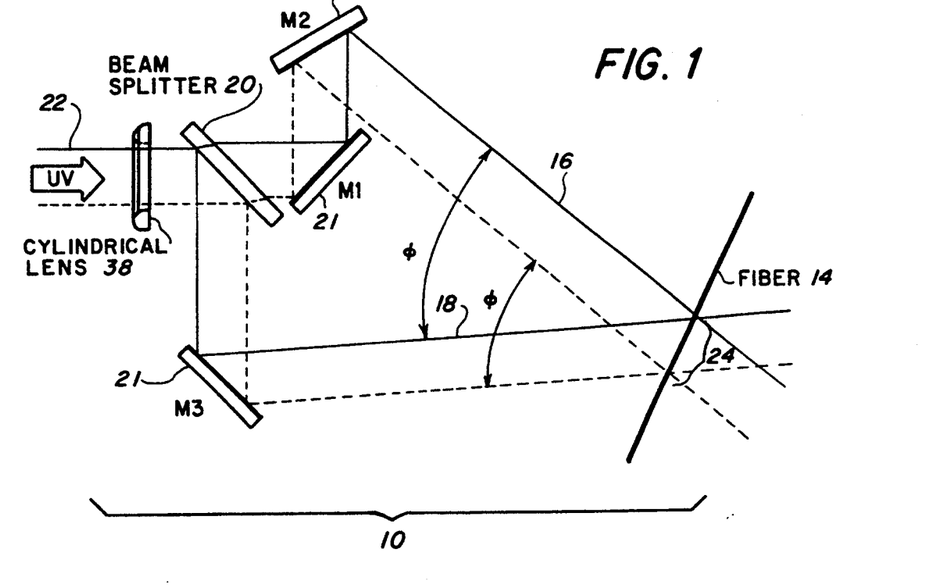
FIG. 1 shows a preferred interferometer for production of gratings.

A preferred characteristic of an interferometer 10 used in this invention is preserving the handedness of the writing beam 22, so that the left side of one beam 16 overlaps the left side of the other beam 18 at intersection 24, and likewise for the right side. This characteristic is preferred in embodiments where the writing laser 22 has poor transverse beam quality, to eliminate the detrimental effects of this poor beam quality. To improve the effective beamfront quality of the writing laser 22, it is preferred that, following the beamsplitter 20, one light path of the interferometer 10 includes m mirrors 21 and the other light path of the interferometer 10 includes m$\pm$n mirrors 21, such that $|m-n|$ is an odd integer, as shown in FIG. 1. In this way, both beams 16,18 are reflected the same number of times, thereby preserving the handedness of the beams 16,18, so that the left hand side of one beam 16 overlaps with the left hand side of the other beam 18, and likewise for the right hand side. This is an especially preferred embodiment when the writing laser 23 is an excimer laser. Excimer lasers, though they are in other respects preferred lasers, have characteristically poor transverse beamfront quality. By preserving the handedness of the writing beams 22, this deficiency is largely eliminated.

Another preferred characteristic of an interferometer 10 used in this invention is long depth of field. It is preferred to not have the intensity of the interference pattern striking the fiber 14 be unduly sensitive to the position of the fiber 14 relative to the interferometer 10. In other words, it is preferred for the peak intensity and contrast of the interference pattern striking the fiber 14 to vary only slightly as the fiber 14 is moved towards, away from, or transverse to the interferometer 10. This precaution provides for tolerance to alignment error caused by vibrations in the draw process and/or operator error.

Another preferred characteristic of an interferometer 10 used in this invention is focal coincidence of the two intersecting beams 10. A skilled practitioner will consider the focusing properties of a cylindrical lens 38, which focuses a collimated beam to a line. The cylindrical lens 38 (or lenses) used to increase beam intensity results in a focal line for each beam of the interferometer 10. It is preferred to have each focal line spatially coincident with the other and to be parallel to the fiber 14. With this arrangement, the intensity at the fiber 14 due to each beam 16,18 may be held constant and equal along the fiber length, and the maximum fluence can be obtained along the greatest fiber length.

Another preferred characteristic of an interferometer 10 used in this invention is for lens aberrations to be canceled. If a plurality of concentrating lenses 38 are used, or if the interfering write beams 16,18 pass through different parts of the same lens 38, irregularities in lens geometry or position may detract from the quality of the interference pattern.

FIGS. 1 through 4 show a variety of preferred interferometers, however these interferometers are not exclusive of others.

For the preferred interferometer 10 shown in FIG. 1, the cylindrical lens 38 is placed between the laser source 23 and the beamsplitter 20. This interferometer 10 is the most preferred interferometer for systems using a laser 22 with poor transverse beamfront quality, because it preserves the handedness of the interfering writing beams 16,18, thus canceling irregularities in the beamfront. Placing the cylindrical lens 38 remote from the fiber 14 provides a long depth of field for the interference pattern. Because there is only one lens 38, and the source beam 22 passes through the lens 38 only once, lens aberrations are canceled. However, there is no way to position this lens 38 to provide focal coincidence.

Figure 2:
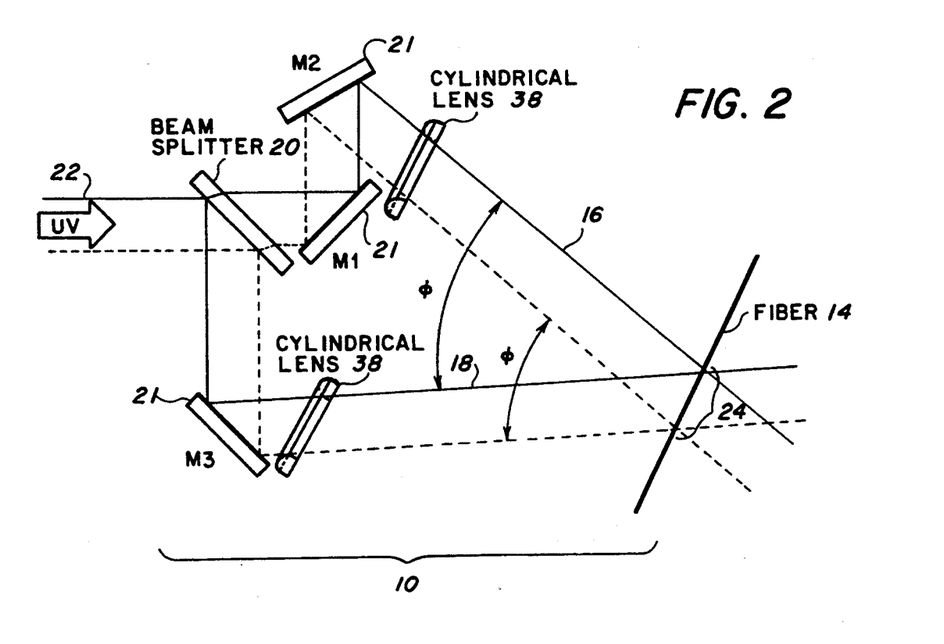
FIG. 2 shows another preferred interferometer for production of gratings.

In the preferred interferometer 10 shown in FIG. 2, a cylindrical lens 38 is positioned in each arm of the interferometer 10. Like the interferometer 10 in FIG. 1, this interferometer 10 provides handedness preservation and a large depth of field. Because each of these lenses 38 can be independently rotated, focal coincidence is provided. However, because there are two cylindrical lenses 38, which must be independently positioned and which may have unique aberrations, lens aberrations are not canceled.

Figure 3:
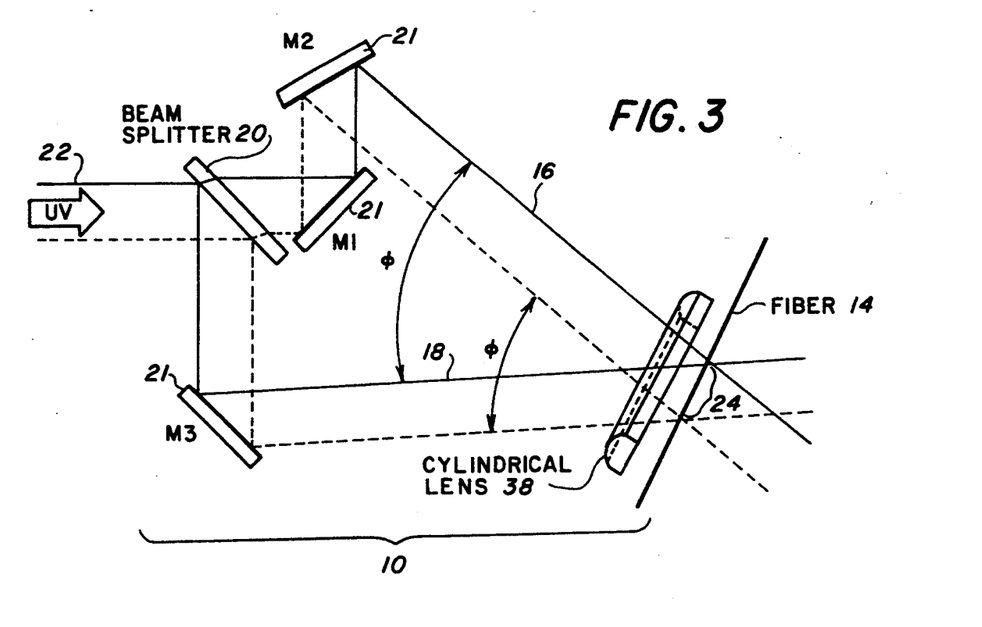
FIG. 3 shows another preferred interferometer for production of gratings.

In the preferred interferometer 10 shown in FIG. 3, a single cylindrical lens 38 is positioned adjacent to the fiber 14, in or near the intersection region 24 of the interfering writing beams 16,18. Like the interferometer 10 in FIG. 2, this interferometer 10 provides handedness preservation and focal coincidence. However, the proximity of the lens 38 to the fiber 14 makes for a short depth of field. Moreover, because different parts of the lens 38 are used by the two beams 16,18, lens aberrations are not canceled.

Figure 4:
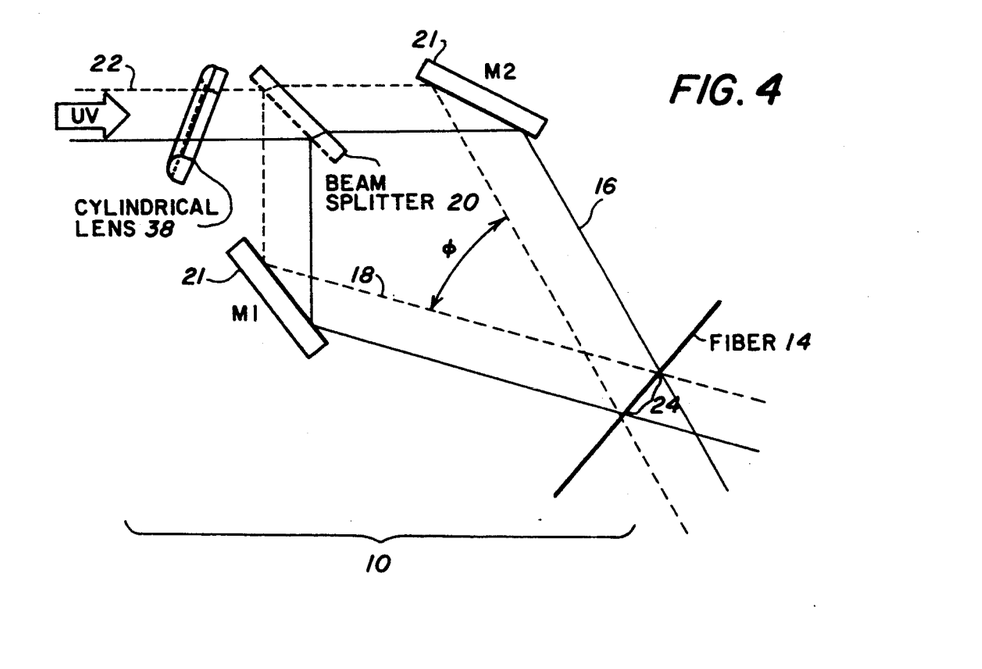
FIG. 4 shows another preferred interferometer for production of gratings.

FIG. 4 shows another preferred interferometer 10, with an equal number of mirrors 21 in each arm of the interferometer 10, and a cylindrical lens 38 placed between the laser source 23 and the beamsplitter 20. Although this interferometer 10 does not preserve the handedness of the beam 22, it does possess the other desirable characteristics of an interferometer 10 according to this invention, and thus is the preferred interferometer 10 for use with writing laser beams 22 with good transverse beam quality, where preserving the beam handedness is not critical.

The advantages of each of these interferometers are summarized in Table 1.

Skilled practitioners will recognize that if the coherence length of the writing laser 23 is too short, and if the interferometer employed does not provide focal coincidence, the writing beams 16,18 will not form a strongly modulated interference pattern, and a grating may not result. For the preferred interferometer 10 for lasers with poor transverse beam quality shown in FIG. 1, the coherence length of the writing laser 23 should well exceed at least about $L \cdot \sin(\phi/2)$, wherein L is the axial length of the grating 11 to be written and $\phi$ is the angle between the two writing beams 16,18. Most preferably, the writing laser 23 has a coherence length of at least about $10L \cdot \sin(\phi/2)$, For this interferometer 10 geometry, it is expected that a writing laser 23 with a coherence length of at least about 1 mm will be sufficient to write gratings 11 according to this invention, Preferably, the writing laser 23 has an energy output of at least about 50 mJ per pulse, and a duration of at most about 20 ns. For germanosilicate glasses, the most preferred laser 23 will be a KrF excimer laser, operating at about 248 nm, The novel gratings 11 made by this process have thermal stabilities that are uniquely high for laser-induced gratings. The known multiple-pulse gratings (MPGs) (including the known gratings made with cw lasers) begin to lose reflectivity after several minutes at 300° C., and are effectively erased with temperatures approaching 800° C.

Figure 7:
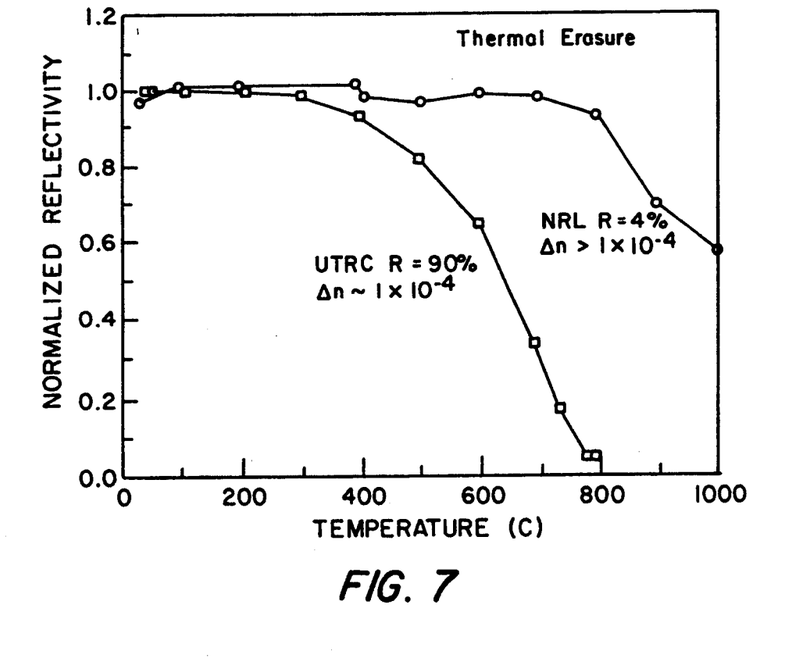
FIG. 7 compares the thermal stability of known gratings to the thermal stability of the novel gratings of the invention.

FIG. 7 compares the thermal stability of MPGs to the thermal stability of the present gratings 11, The upper curve shows the change in the reflectivity of the present gratings after annealing for at least 40 minutes (in some eases much longer) at various temperatures. The lower curve is take from Meltz et al,, "Bragg grating formation and germanosilicate fiber sensitivity", *International Workshop on Photoinduced Self-Organization Effects in Optical Fiber*, SPIE Vol. 1516, 185-99 (1991). This curve shows the change in the reflectivity of MPGs after annealing at various temperatures for approximately 10 minutes at each temperature. At temperatures up to about 200° C., neither grating is affected. At 300° C., permanent degradation in the MPG has begun, and at 400° C. there is a loss of about 10% of the reflectivity. At 500° C. the MPG has lost about 20% of its reflectivity, and at 600° C. the MPG has lost about 35% of its reflectance. By 800° C., only about 5% of the MPG's original reflectivity remains.

By contrast, as also shown in FIG. 7, essentially no change occurs in the present grating after annealing at 700° C. for nearly three hours. Only about a 10% loss in reflectivity is observed after annealing for 30 min. at 800° C. Only about a 35% loss in reflectivity is observed after annealing an additional two hours at 900° C., and only about a 40% loss in reflectivity is observed after further annealing at 1000° C. for 40 min.

Figure 8:
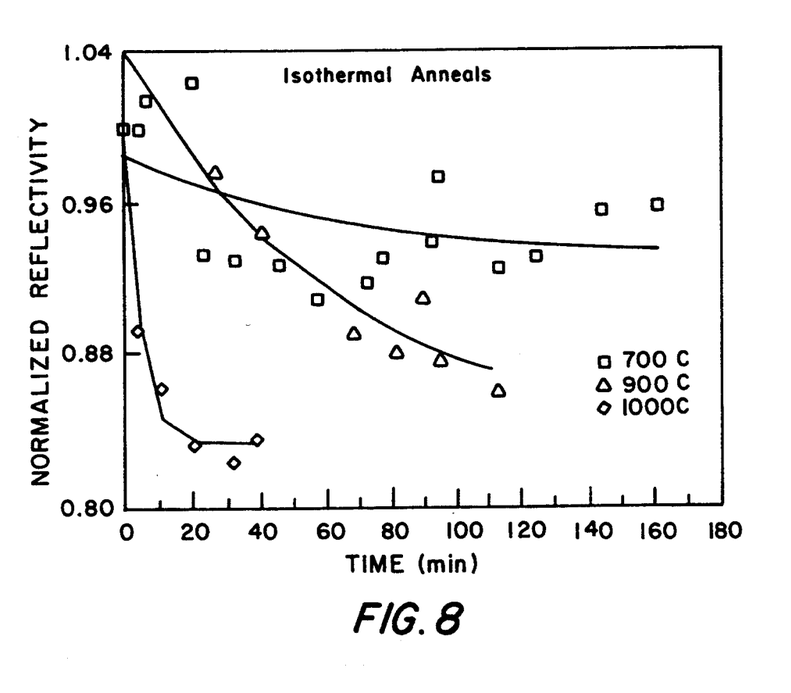
FIG. 8 shows the thermal stability of the novel gratings of the invention after a variety of isothermal anneals.

FIG. 8 shows the thermal stability of the novel gratings of the invention after a sequence of isothermal anneals at progressively higher temperatures (signal amplitudes are normalized to the value measured upon first reaching a temperature). Annealing at 700° C. results in a loss of reflectivity of at most about 5%, even after heating for nearly three hours. Annealing at 900° C. results in a loss of reflectivity of about 4% after 40 minutes, about 10% after 60 minutes, about 12% after 100 minutes, and about 15% after 120 minutes; the loss of reflectivity slows with time. Annealing at 1000° C. results in a loss of reflectivity of about 20% after 30 minutes, and again the loss of reflectivity slows with time.

After annealing for four hours at above 800° C., over 60% of the grating reflectivity remains.

Having described the invention, the following example is given to illustrate a specific application of the invention, including the best mode now known to perform the invention. This specific example is not intended to limit the scope of the invention described in this application.

EXAMPLE

The interferometer 10 shown in FIG. 1 was assembled. The writing laser 23 was a line-narrowed (coherence length>4 cm) Lambda Physik Model EMG 150 MSC excimer laser delivering 0.1 J of energy per 20 ns pulse in a 5 mm×20 mm beam 22. The cylindrical lens 38 converged the long (20 mm) axis of the beam 22 to 2 mm at in the focal region 24 of the interferometer 10. The beamsplitter 20 was a 50% beamsplitter that divided the laser beam 22 into two beams 16,18 of essentially equal intensity. The writing beams 16,18 were directed to intersect at the sample position (i.e. at the focal region 24 of the interferometer 10), with the bisector of the two write beams 16,18 normal to the sample. The angle between the two write beams (the write angle, $\phi b$) was about 56°.

A glass preform was prepared with a cladding composition of 2.4 wt % $GeO_2$, 0.54 wt % F, and the balance $SiO_2$, and a core composition of 15.2 wt % $GeO_2$ and the balance $SiO_2$. A fiber 14 was prepared from this preform by the modified CVD process (sometimes referred to as the inside CVD process). This fiber 14 had an $OH^-$ concentration of 0.1%, a numerical aperture (NA) of 0.16, and a core diameter of 4.7 $\mu$m. The fiber 14 was positioned at the focal region 24 of the interferometer 10, and exposed to a single 20 ns pulse of 248 nm light to induce a grating 11.

This fiber 24 was sequentially annealed at progressively higher temperatures of 700° C., 800° C., 900° C., and 1000° C. The fiber 14 was held at each temperature for at least 40 min. The reflectivity of the grating 11 was periodically measured during each isothermal anneal. The results for the anneals at 700° C., 900° C., and 1000° C. are given in FIG. 8.

Obviously, many modifications and variations of the present invention are possible in light of the above teachings. It is therefore to be understood that, within the scope of the appended claims, the invention may be practiced otherwise than as specifically described.

What is claimed is:

1. A process for writing an optical grating into a glass fiber, comprising the steps of:
   (a) providing an unjacketed glass fiber, and
   (b) transversely exposing said glass fiber to a single pulse from a pair of interfering writing beams, to create an interference pattern in said fiber, wherein said pulse has sufficient fluence to induce an index modulation in said fiber corresponding to said interference pattern.

2. The process of claim 1, wherein said interfering write beams have a wavelength of light corresponding to a spectral absorption in the glass wherein incident laser photons induce a permanent alteration in the glass structure, resulting in a permanent index change in said fiber.

3. The process of claim 1, wherein said step of providing said unjacketed glass fiber comprises extracting said unjacketed fiber from a furnace, without applying a coating to said fiber, prior to said step of transversely exposing said fiber.

4. The process of claim 3, comprising the additional step of applying a coating to said fiber, after said step of transversely exposing said fiber.

5. The process of claim 4, wherein said steps of extracting said unjacketed glass fiber from said furnace, transversely exposing said fiber, and applying a coating to said fiber, are executed continuously as said fiber is extracted from said furnace.

6. The process of claim 5, wherein the angle between said interfering writing beams is selected, whereby a grating with a selected Bragg spacings is prepared.

7. The process of claim 6, wherein a plurality of said steps of transversely exposing said fiber are executed continuously as said fiber is extracted from said furnace, and wherein a plurality of said steps of selecting said angle between said interfering writing beams are executed synchronously with said steps of transversely exposing said fiber and continuously as said fiber is extracted from said furnace, whereby an array of gratings with independently selected Bragg spacings is prepared.

8. The process of claim 5, wherein said fiber is extracted from said furnace at a rate of at least about 5 m/s, wherein said writing beams have wavelengths of at least about 800 nm and wherein said pulse has a duration of not more than about 20 ns.

9. The process of claim 1, wherein said pulse from each of said writing beams has a fluence of at least about 0.5 J/cm$^2$ per beam at said fiber.

10. The process of claim 9, wherein said step of exposing said fiber comprises exposing said fiber to interfering write beams formed by splitting a beam from a laser into two write beams, and directing said two write beams to intersect at said fiber.

11. The process of claim 10, wherein said two write beams comprise a first write beam and a second write beam, and wherein the step of directing said two write beams to intersect at said fiber comprises directing said first beam to said fiber by a beam path defined by a first series of mirrors, and directing said second beam to said fiber by a beam path defined by a second series of mirrors, wherein said second series of mirrors comprises a number of mirrors different by an odd number than the number of mirrors in the first series of mirrors, whereby the handedness of said interfering beams are maintained relative to each other.

12. The process of claim 10, wherein said laser has a coherence length of at least about $L \cdot \sin(\phi/2)$, wherein L is the axial length of the grating to be written and $\phi$ is the angle between said two writing beams.

13. The process of claim 10, wherein said laser has a coherence length of at least about $10L \cdot \sin(\phi/2)$, wherein L is the axial length of the grating to be written and $\phi$ is the angle between said two writing beams.

14. The process of claim 10, wherein said laser has a coherence length of at least about 1 mm and an energy output of at least about 50 mJ per pulse, wherein said pulse has a duration of at most about 20 ns.

15. The process of claim 10, wherein said glass fiber is a germanosilicate fiber.

16. The process of claim 10, wherein said laser has an operating wavelength of about 248 nm.

17. The process of claim 16, wherein said laser operating at about 248 nm is a KrF excimer laser.

18. The process of claim 1, wherein said pulse from each of said writing beams has a fluence of at least about 1.0 J/cm$^2$ per beam at said fiber.

19. The process of claim 18, wherein said glass fiber is a silicate fiber doped with a rare earth element, and wherein said laser has an operating wavelength essentially equal to a resonance wavelength for said rare earth doped silicate.

20. The process of claim 19, wherein said rare earth element is europium.

21. The process of claim 19, wherein said rare earth element is praseodymium.

22. The process of claim 18, wherein said glass fiber is a silicate fiber doped with cerium and aluminum.

23. A glass fiber including at least one optical grating with a preselected Bragg spacing in at least one region of said fiber, wherein said grating is formed by transversely exposing said glass fiber to a pulse from a pair of interfering writing beams, to create an interference pattern in said fiber, Wherein said pulse has sufficient fluence to induce an index modulation in said fiber corresponding to said interference pattern, wherein said grating has a periodic modulation in its index of refraction, wherein said modulation remains essentially constant after annealing at a temperature of about 300° C.

24. A glass fiber including at least one optical grating with a preselected Bragg spacing in at least one region of said fiber, wherein said grating has a reflectance bandwidth, and wherein said reflectance bandwidth of said grating is not more than about 20% wider than the theoretical bandwidth of said grating, wherein said theoretical bandwidth is given by the formula $\lambda/2L$, wherein L is the axial length of said grating and $\lambda$ is the wavelength of interfering write beams used to write said grating.

25. An unspliced glass fiber including a plurality of optical gratings with preselected Bragg spacings in preselected regions on said fiber, wherein each of said plurality of gratings is formed by transversely exposing said glass fiber to a pulse from a pair of interfering writing beams, to create an interference pattern in said fiber, wherein said pulse has sufficient fluence to induce an index modulation in said fiber corresponding to said interference pattern, wherein said fiber is at least about 5 meters long.

* * * * *